United States Patent Office 3,428,574
Patented Feb. 18, 1969

3,428,574
CRYSTALLINE ZEOLITE
Edward Michalko, Chicago, Ill., assignor to Universal Oil Products Company, Des Plaines, Ill., a corporation of Delaware
No Drawing. Continuation-in-part of application Ser. No. 359,414, Apr. 13, 1964. This application Dec. 3, 1965, Ser. No. 511,340
U.S. Cl. 252—455   17 Claims
Int. Cl. B01j *11/40;* C01b *33/28*

ABSTRACT OF THE DISCLOSURE

Synthetic crystalline faujasite containing zeolites can be prepared in a process in which refractory oxide particles are contacted with, and aged in, a solution of an alkali metal compound, such as sodium aluminate, after which the pH of the solution is raised and the particles are again aged in a second aging step until the particle has substantially converted to a faujasite containing zeolite. The materials are useful as absorbents, catalysts and catalysts supports.

---

This invention is a continuation-in-part of my copending application Ser. No. 359,414 filed Apr. 13, 1964, now U.S. Patent No. 3,359,068.

This invention relates to improved binderless crystalline zeolites and to their method of manufacture. More specifically, this invention relates to high silicia content binderless crystalline aluminosilicate having a substantial portion of pore entrances sufficiently large to allow the passage of benzene therethrough in an attrition resistant aggregate form of desired shape. Further, this invention relates to a method of preparing a synthetic faujasite containing zeolite particle having a predetermined size and shape and to a method of converting said faujasite containing zeolite particle into a catalyst suitable for use in upgrading petroleum fractions. The zeolites produced by the method of this invention are especially preferable catalyst supports since they are readily prepared in any desired size and shape. Although these zeolites are described as catalyst supports, it is to be understood that the properties of the zeolite itself may be responsible for some of the catalytic properties of the finished catalyst and the word support is intended to include those properties.

In one of its embodiments this invention relates to a method of preparing a synthetic crystalline faujasite containing zeolite particle having a predetermined size and shape which comprises: preparing a solid refractory inorganic oxide particle of said size and shape comprising an oxide selected from the group consisting of silica and alumina; bringing said particle into contact with an aqueous treating solution containing alkali metal cations and anions selected from the group consisting of hydroxyl, silicate and aluminate, the composition of said treating solution being established in relation to the original composition of said particle to incorporate both silica and alumina in the finished zeolite in the desired amounts; maintaining said particle in contact with said treating solution in a first aging step for a period of time sufficient to allow the silicon atoms and silicon containing molecules and the aluminum atoms and aluminum containing molecules to intimately admix; introducing additional basic material to increase the pH of the treating solution and continuing the aging in a second aging step for a period of time until the particle has substantially converted to a faujasite containing zeolite of approximately said size and shape; and separating the zeolite particle from the treating solution.

The zeolites of the present invention are crystalline having many small cavities connected by still smaller pore entrances. The present zeolites have a substantial portion of pore entrances in the range of from about 6 to about 15 Angstroms. These pore entrances are sufficiently large to allow the passage of hydrocarbon compounds such as branched chain paraffins and most aromatics therethrough which allow these zeolites to be advantageously used as catalyst supports. Catalyst particles are widely used both in fluid bed and in fixed bed processes in which the particles are desired in the form of coarse pieces rather than powdered masses. In fixed bed processes, catalysts of from 8 mesh to 70 mesh in size are preferable whereas in fluid processes catalysts of from 100 to 200 or even 350 mesh in size are preferable. The use of particles in substantially spherical shape offers numerous advantages particularly when the particle is used as a catalyst for the conversion of organic compounds and still more particularly for the conversion of hydrocarbons. When used in a fixed bed of packing material in a reaction zone, the spherical shaped particles permit more uniform packing and thereby reduce variations in pressure drop throughout the bed and accordingly reduce channeling and efficiently contact the reactants with the catalyst. Another advantage in the use of particles of spherical shape is that the spheres contain no sharp edges to break or wear off during processing or handling and therefore reduce the tendency to plug the process equipment. These advantages are magnified when the particles are used as a moving or fluid bed, that is, when the particles are transported from one zone to another by either the reactants or by an extraneous carrying medium. It is thus seen that the use of catalyst particles in this shape permits a more effective utilization of these particles.

Present methods of producing crystalline synthetic zeolites are not satisfactory in either producing particles of desired size or of desired shape. Prior art methods typically produce zeolites in a finely divided powdered form ranging in size from 0.5 to 5 microns. In order to obtain these zeolites in a useful size, the powdered zeolite is agglomerated with a binder such as clay to produce particles of desired size. These particles are typically produced in pellets or beads of non-uniform size or shape through methods such as extrusion. In order that the particles be held together with sufficient strength, binders in concentrations up to 20 or more weight percent of the total particle are employed. This results in a particle composed of a mixture of binder and zeolite in which the binder occupies valuable space but makes no catalytic contribution to the particle. Furthermore, binders have to be carefully screened in order to ensure that they do not promote undesirable side reactions.

Although there are many zeolites, the pore openings must be sufficiently large to allow reactant molecules to enter and leave the pore structure of the catalyst. When using catalysts in the conversion of hydrocarbons contained in petroleum fractions, it is necessary that most of the commonly occurring wide cross sectional molecules such as branched chain paraffins and aromatics be able to pass through the pore entrances and thus gain access to the active catalytic sites. The most preferable crystalline zeolite structure for catalytic uses is that called faujasite since it is a very open structure having pore entrances in the vicinity of about 8 to 11 Angstroms in diameter. This natural occurring faujasite may be prepared synthetically in varying silicon to aluminum mole ratios from about 1 to about 3. The faujasites are composed of electrically neutral silicon tetrahedra and negatively charged aluminum tetrahedra, the latter tetrahedra requiring a cation having a valence of $+1$ to neutralize it. When faujasite is ion exchanged with a divalent cation, the divalent cation is shared with two aluminum tetrahedra. As the aluminum tetrahedra are spread further apart (by increasing the $SiO_2/Al_2O_3$ mole ratio in the faujasite) the strength of areas of residual electrical charge tends to increase since it becomes physically impossible for one divalent cation to stretch across two widely spread aluminum tetrahedra. Another method of producing areas of residual charge on a faujasite zeolite is to decationize the zeolite, a procedure described in U.S. Patent No. 3,130,006. It is also found that it is possible to decationize a high silica content faujasite to a greater extent than a low silica content faujasite without collapse of the rigid aluminosilicate structure. These areas of local charge in the faujasite give rise to catalytic activity and the resulting faujasite structure is an especially preferable catalyst support.

It is an object of this invention to prepare a binderless faujasite containing aluminosilicate in any desired size and shape.

It is another object of this invention to produce synthetic binderless faujasite containing aluminosilicates directly in the form of useful aggregate size and of desired shape as contrasted with prior art powdered form.

It is a more specific object of this invention to produce a spherically shaped binderless synthetic faujasite containing aluminosilicate.

It is a further object of this invention to utilize the binderless synthetic faujasite containing aluminosilicate as a catalyst support.

These and other objects will become more apparent in the light of the following detailed description.

The manufacture of binderless crystalline zeolites by aging a solid refractory oxide in a treating solution is described in patent application Ser. No. 359,414 filed Apr. 13, 1964 and the teachings therein are hereby incorporated into this application. It has been found that it is difficult to prepare high silica content faujasite containing zeolites of desired size and shape by the method taught in Ser. No. 359,414 since the required high concentration of sodium hydroxide tends to digest the solid refractory particles thus destroying the size and shape of the particles. Although high silica content faujasite contaniing zeolites can be produced by the method or Ser. No. 359,414, they are not always retained in the desired size and shape. However, I have found that by producing these zeolites by a two-step procedure, the size and shape are preserved. In essence, the solid refractory oxide particle is first contacted with a treating solution having less than the required amount of basic material (sodium hydroxide) in a first aging step which permits the silicon atoms and silicon containing molecules to intimately admix with the aluminum atoms and aluminum containing molecules. After the admixture, additional basic material is added to increase the pH to the required amount and the reactants are allowed to react in a second aging step. By using this procedure, high silica content faujasite containing aluminosilicates can be produced in the size and shape of the solid refractory oxide.

The solid refractory oxide particle is prepared as described in said copending application and is preferably composed of silica, alumina or an amorphous mixture of silica and alumina. It is preferable that the refractory oxide particle be calcined prior to contacting the treating solution. When silica refractory oxide particles are employed, preferably the treating solution comprises sodium aluminate whereas if alumina particles are employed, preferably the treating solution comprises sodium silicate. The composition and amount of the treating solution is established in relation to the composition and amount of the refractory oxide particles to incorporate both silica and alumina in the finished zeolite in the desired amount. The first aging step which is accomplished by contacting the refractory oxide particles with the treating solution is carried out at temperatures of from about 20° C. to about 120° C. and preferably from 25° C. to about 95° C. The contacting times in the first aging step vary from about 1 to about 48 hours, although the required times are dependent somewhat on the temperatures. Generally, the higher the temperature, the shorter is the required contacting time. It is preferred that the sodium to aluminum mole ratio be maintained at from about 1.0 to about 1.6 during the first aging step while maintaining the silicon to aluminum ratio at about the desired finished zeolite ratio. After completing the first aging step, additional sodium hydroxide is added to the particles and treating solution to increase the pH and increase the sodium ion concentration until the mole ratio of sodium to silicon is at least above 0.9 and preferably at about 1.0. The particles are left in contact with this latter solution for a second aging step. Preferably the second aging step contact time will vary from about 5 to about 100 hours depending upon the temperatures maintained during the second aging step. It is generally convenient to maintain the temperature during the second step at substantially from about 40° C. to about 120° C. and preferably from about 60° C. to about 95° C. After the particles have been converted to the crystalline faujasite containing zeolite in the size and shape of the original refractory oxide particles, they are separated and water washed.

The twice aged zeolite is converted to a preferable catalyst support by ion exchange with suitable cations. One preferable method is to "decationize" the zeolite by ion exchanging the sodium zeolite with ammonium ions followed by thermal treatment. It is preferable to decationize the aged zeolite until at least less than 90% and preferably less than 70% of the aluminum tetrahedra are not associated with cations. The thermal treatment is preferably carried out at temperatures of between about 425° C. and about 575° C. Another preferable method is to ion exchange the aged sodium zeolite with divalent cations selected from the group consisting of calcium, magnesium and beryllium to displace at least 30% and preferably at least 50% of the sodium cations. It has been found that either the decationization procedure or the divalent cations create isolated areas of electrical charge which are useful in catalyzing numerous reactions, especially those involving the so-called carbonium ion mechanism. Examples of these reactions comprise isomerization, reforming and hydrocracking. It is also within the scope of this invention to both incorporate divalent cations and to additionally decationize the zeolite to optimize catalytic activity. These zeolites may also be employed in catalytic cracking reactors either in fixed or fluid beds with or without additional catalytic agents such as rare earth metals. These ion-exchanged zeolites are especially preferable supports upon which to deposit a Group VIII metal in order to make a finished catalyst. The Group VIII metal may be deposited on these zeolites by techniques such as ion-exchange or impregnation although the former technique is preferable. Especially preferable Group VIII metals comprise nickel, palladium and platinum. The Group VIII metal is deposited on the zeolite supports of this invention preferably in concentrations of from about 0.05 wt. percent up to about 4.0 weight percent.

The Group VIII metal finished catalysts are employed to upgrade various hydrocarbon feeds by converting the feeds in isomerization, reforming, hydrocracking and other reaction zones. These finished catalysts are especially preferable catalysts for hydrocracking various petroleum feed stocks such as gas oils, cycle oils, diesel oils, etc., to produce lighter molecular weight products such as LPG, gasoline and kerosene. Generally, the feed stock is introduced into a first hydrorefining zone to convert a substantial portion of the organic nitrogen and sulfur compounds into hydrocarbons, ammonia and hydrogen sulfide. The total effluent from the hydrorefining zone including the ammonia and hydrogen sulfide, if desired, is sent into a hydrocracking zone containing the Group VIII metal zeolite catalyst. The hydrocracking reactor is maintained at hydrocracking conditions, that is at temperatures of from about 450° F. to about 850° F., pressures of from about 500 p.s.i.g. up to about 2000 p.s.i.g., liquid hourly space velocities of from about 0.5 up to about 5.0 and hydrogen to oil (s.c.f./bbl.) of from about 1000 up to about 20,000. The effluent from the hydrocracking zone is recovered and separated into various product streams by means such as flashing and fractionation. If desired, the separated heavy fraction may be recycled either to the hydrorefining zone, to the hydrocracking zone or to a separate hydrocracking zone to further reduce its molecular weight. The catalyst of the present invention is a superior hydrocracking catalyst since it is relatively stable in the presence of nitrogen compounds.

The following examples are presented to further illustrate the preparation of the zeolite support and its conversion to a catalyst, but it is not intended to limit the invention to the materials used nor the conditions disclosed therein.

EXAMPLE 1

Silica hydrogel spheres are prepared by dropping silica sol droplets from a vibrating head into a forming oil. The conditions in the dropping apparatus are set in order to produce silica spheres whose nominal diameter are about $\frac{1}{32}$ of an inch. The spheres are aged in forming oil at 95° C., water washed to remove neutralization salts, dried at 125° C., and calcined at 600° C. 191 grams of the $\frac{1}{32}$ inch calcined silica spheres are introduced into a first flask. To the flask is added 480 cc. of water and 220 cc. of a sodium aluminate solution containing 19.9 wt. percent $Al_2O_3$ and 18.3 wt. percent Na. The flask is allowed to stand at 25° C. for about 4 hours, then the temperature is increased to 95° C. over a period of about 2–3 hours and held there for about 10 hours. A portion of the liquid in the flask is thereupon removed into a second flask and 52 grams of sodium hydroxide pellets are added to the second flask and dissolved therein. The contents of the second flask are emptied into the first flask. The first flask and contents are thereafter aged at 95° C. for 48 hours whereupon the liquid is decanted off the solid particles. The solid particles still in the form of $\frac{1}{32}$ inch spheres are thereupon water washed and a portion thereof is dried. The dried spheres are subjected to an X-ray diffraction analysis and the results are shown in Table A. The nomenclature in Table A is as follows: $dA=d$ value; $I/I_0$=intensity of a given line relative to the strongest line; v.s.=very strong; s.=strong; m.s.=medium strong; m.=medium; w.=weak; v.w.=very weak.

TABLE A

| dA | $I/I_0$ |
|---|---|
| 14.1 | v.s. |
| 9.0 | m. |
| 7.6 | m. |
| 7.2 | m. |
| 5.8 | s. |
| 5.2 | m. |
| 4.8 | m. |
| 4.4 | m.s. |
| 4.15 | w. |
| 3.95 | v.w. |
| 3.80 | s. |
| 3.35 | m.s. |
| 3.20 | m.s. |
| 3.05 | m. |
| 2.87 | s. |
| 2.80 | m. |
| 2.65 | m.s. |

EXAMPLE 2

The zeolite produced in Example 1 is ion-exchanged with magnesium ions with several fresh solutions of magnesium chloride. The magnesium exchanged zeolite is ion-exchanged with one fresh solution containing ammonium ions and the resulting zeolite is thermally treated at 500° C. About 0.5 wt. percent palladium is introduced into the thermally treated zeolite by ion-exchange. The resulting catalyst is loaded into a hydrocracking reaction vessel. A hydrorefining reaction vessel is loaded with a nickel-molybdenum catalyst impregnated on an amorphous silica-alumina support. A gas oil containing about 1000 wt. p.p.m. nitrogen and 2 wt. percent sulfur is introduced into the hydrorefining reaction vessel maintained at a temperature of about 700° F., a pressure of about 1560 p.s.i.g., a liquid hourly space velocity of about 2.0 and a hydrogen to oil ratio (s.c.f./bbl.) of about 5000.

The total effluent from the hydrorefining zone is introduced into the hydrocracking reaction zone maintained at a pressure of 1500 p.s.i.g., a LHSV of 1.5 and a hydrogen to oil ratio (s.c.f./bbl.) of about 9000. The temperatures are adjusted to maintain a constant conversion (70% of the product to $C_5$—400° F. E.P. gasoline). The run is continued for a period of time and is quite stable.

I claim as my invention:

1. A method of preparing a synthetic crystalline faujasite containing zeolite particle having a predetermined size and shape which comprises:

preparing a solid refractory inorganic oxide particle of said size and shape comprising an oxide selected from the group consisting of silica and alumina;

bringing said particle into contact with an aqueous treating solution containing alkali metal cations and anions selected from the group consisting of hydroxyl, silicate and aluminate, the composition of said treating solution being established in relation to the original composition of said particle to incorporate both silica and alumina in the finished zeolite in the desired amounts;

maintaining said particle in contact with said treating solution in a first aging step for a period of time sufficient to allow the silicon atoms and silicon containing molecules and the aluminum atoms and aluminum containing molecules to intimately admix, and holding the pH of said treating solution during said first aging step below the point at which formation of crystalline faujasite occurs;

introducing additional basic material to increase the pH of the treating solution and continuing the aging in a second aging step for a period of time until the particle has substantially converted to a faujasite containing zeolite of approximately said size and shape; and separating the zeolite particle from the treating solution.

2. The method of claim 1 wherein the solid inorganic oxide particle is a calcined particle composed substantially of either silica, alumina or an amorphous mixture of silica and alumina; the alkali metal cations comprise sodium, and the basic material comprises sodium hydroxide.

3. The method of claim 2 further characterized in that the calcined particle comprises silica and the treating solution comprises sodium aluminate, the mole ratio of sodium to aluminum in the first aging step is maintained at from about 1.0 to about 1.6 and the mole ratio of sodium to silicon in the second aging step is maintained at least above 0.9.

4. The method of claim 3 further characterized in that the temperature in the first aging step is maintained at from about 20° C. to about 120° C., the time for the first aging step is from about 1 to about 48 hours, the temperature in the second aging step is maintained at from 40° C. to about 120° C. and the time for the second aging step is from about 5 to about 100 hours.

5. The method of claim 4 further characterized in that the temperature of the second aging step is maintained at from about 60° C. to about 95° C., the temperature in the first aging step is maintained at from 25° C. up to about 95° C., the sodium to silicon mole ratio in the second aging step is maintained at about 1 and the silicon to aluminum mole ratio of the finished zeolite is from about 1 to about 3.

6. The zeolite product produced by the method of claim 5.

7. The zeolite produced in claim 5 further characterized in that said zeolite is subjected to an ion-exchange step with at least one cation selected from the group consisting of ammonium, calcium, magnesium and beryllium.

8. The product of claim 7 further characterized in that the product is subjected to an ion-exchange step with ammonium ions and the ion-exchanged product is thermally treated at temperatures of between 425° C. and 575° C.

9. The product of claim 8 further characterized in that said product is employed as a catalyst support, said catalyst containing at least one Group VIII metal selected from the group consisting of nickel, palladium and platinum.

10. A method of preparing a synthetic crystalline faujasite containing zeolite which comprises
    (a) contacting a refractory oxide particle comprising an oxide selected from the group consisting of silica, alumina and silica and alumina with an aqueous solution of an alkali metal compound selected from the group consisting of hydroxide, silicate, and aluminate
    (b) aging the refractory oxide particle in the solution while holding the pH of the solution below the point at which formation of crystalline faujasite occurs
    (c) raising the pH of the solution to a level at which conversion of the refractory oxide to crystalline faujasite occurs
    (d) aging the refractory oxide in the solution until the refractory oxide has substantially converted to a crystalline faujasite containing zeolite.

11. A method according to claim 10 in which the refractory oxide particle is composed substantially of an oxide selected from silica, alumina and an amorphous mixture of silica and alumina; the particle is calcined prior to use; the alkali metal of (a) is sodium, the composition of the aging solution of (b) is established so as to provide a finished zeolite having desired amounts of silica and alumina; and the pH in (c) is raised with sodium hydroxide.

12. A method according to claim 10 in which the aging step of (b) is maintained at a temperature of from about 20° C. to about 120° C. over a period of about 1 to about 48 hours, and the temperature of aging step (d) is maintained at from 40° to about 120° C. over a period of from about 5 to about 100 hours.

13. A method according to claim 10 in which the refractory oxide particle is calcined silica, which is contacted with a solution of sodium aluminate; the mole ratio of sodium to aluminum in aging step (b) is maintained at from about 1.0 to about 1.6; the pH in (c) is raised with sodium hydroxide and the mole ratio of sodium to silicon in aging step (d) is maintained above 0.9.

14. A method according to claim 13 in which the temperature of aging step (b) is maintained at from 25° C. to about 95° C., the temperature of aging step (d) is maintained at from about 60° C. to about 95° C., the sodium to silicon mole ratio in aging step (d) is maintained at about 1 and the silicon to aluminum mole ratio of the finished zeolite is from about one to about 3.

15. A process according to claim 10 in which the refractory oxide particle has a spherical shape.

16. A process according to claim 10 in which the refractory oxide particle has a spherical shape and is obtained by preparing a silica sol; dropping said sol through a bath of forming oil to form a spherical silica particle; and calcining said particle by heating at an elevated temperature.

17. A process according to claim 16 in which the crystalline faujasite containing zeolite prepared is substantially spherical in shape.

References Cited

UNITED STATES PATENTS

| | | | |
|---|---|---|---|
| 3,227,660 | 1/1966 | Hansford | 252—455 |
| 3,264,059 | 8/1966 | McDaniel | 252—455 X |
| 3,287,282 | 11/1966 | Stiles | 252—455 |
| 3,341,284 | 9/1967 | Young | 252—455 X |

DANIEL E. WYMAN, Primary Examiner.

C. F. DEES, Assistant Examiner.

U.S. Cl. X.R.

252—459; 23—112